United States Patent
Nakajima et al.

(10) Patent No.: US 9,561,502 B2
(45) Date of Patent: Feb. 7, 2017

(54) CONDUCTIVE POLYMER MATERIAL, METHOD FOR PRODUCING CONDUCTIVE POLYMER MATERIAL, AND IMAGE FORMING DEVICE MEMBER

(71) Applicant: BRIDGESTONE CORPORATION, Chuo-ku, Tokyo (JP)

(72) Inventors: Tadashi Nakajima, Setagaya-ku (JP); Hirotaka Tagawa, Yokohama (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 14/760,229

(22) PCT Filed: Jan. 10, 2014

(86) PCT No.: PCT/JP2014/050376
§ 371 (c)(1),
(2) Date: Jul. 10, 2015

(87) PCT Pub. No.: WO2014/109405
PCT Pub. Date: Jul. 17, 2014

(65) Prior Publication Data
US 2015/0352542 A1      Dec. 10, 2015

(30) Foreign Application Priority Data

Jan. 11, 2013   (JP) .................................. 2013-003938

(51) Int. Cl.
*G03G 7/00*       (2006.01)
*B01J 41/12*      (2006.01)
(Continued)

(52) U.S. Cl.
CPC .............. *B01J 41/125* (2013.01); *C08G 18/48* (2013.01); *C08G 18/4808* (2013.01);
(Continued)

(58) Field of Classification Search
CPC .......... B01J 41/125; G03G 7/00; G03G 15/00; G03G 15/08; G03G 15/16; C08G 18/48; C08G 18/4829; C08G 18/4854; C08G 18/4808; C08G 18/4812; H01B 1/122
USPC ......... 521/25; 399/103, 105, 106, 98; 355/15
See application file for complete search history.

(56) References Cited

U.S. PATENT DOCUMENTS 4,567,206 A    1/1986  Matsui et al.

FOREIGN PATENT DOCUMENTS

JP    60-084313 A   5/1985
JP    60-084314 A   5/1985
(Continued)

OTHER PUBLICATIONS

International Search Report for PCT/JP2014/050376 dated Apr. 8, 2014 [PCT/ISA/210].
Communication dated Aug. 5, 2016, from the European Patent Office in counterpart European application No. 14737745.1.

*Primary Examiner* — Michael M Bernshteyn
(74) *Attorney, Agent, or Firm* — Sughrue Mion, PLLC

(57) ABSTRACT

A conductive polymer material which can achieve longer operating life by improving resistance stability at the time of performing continuous conduction, a method for producing the conductive polymer material, and an image forming device member are provided. A conductive polymer material containing a quaternary ammonium base incorporated in a main chain of a polymer material as an electrolyte cation, and an alkyl sulfate radical as an electrolyte anion.

9 Claims, 3 Drawing Sheets

(51) Int. Cl.
*C08G 18/48* (2006.01)
*G03G 15/00* (2006.01)
*G03G 15/16* (2006.01)
*G03G 15/08* (2006.01)
*H01B 1/12* (2006.01)

(52) U.S. Cl.
CPC ..... *C08G 18/4812* (2013.01); *C08G 18/4829* (2013.01); *C08G 18/4854* (2013.01); *G03G 7/00* (2013.01); *G03G 15/00* (2013.01); *G03G 15/08* (2013.01); *G03G 15/16* (2013.01); *H01B 1/122* (2013.01)

(56) References Cited

FOREIGN PATENT DOCUMENTS

| | | | |
|---|---|---|---|
| JP | 11-199643 A | | 7/1999 |
| JP | 11209633 A | | 8/1999 |
| JP | 2003-182011 A | | 7/2003 |
| JP | 2003182011 A | * | 7/2003 |
| JP | 2003-257491 A | | 9/2003 |
| JP | 2003257491 A | * | 9/2003 |
| JP | 2009-191136 A | | 8/2009 |
| JP | 2009-191137 A | | 8/2009 |
| JP | 2009191136 A | * | 8/2009 |
| JP | 2009191137 A | * | 8/2009 |
| JP | 2013-134368 A | | 7/2013 |

* cited by examiner

CONDUCTIVE POLYMER MATERIAL, METHOD FOR PRODUCING CONDUCTIVE POLYMER MATERIAL, AND IMAGE FORMING DEVICE MEMBER

CROSS REFERENCE TO RELATED APPLICATIONS

This application is a National Stage of International Application No. PCT/JP2014/050376 filed Jan. 10, 2014, claiming priority based on Japanese Patent Application No. 2013-003938 filed Jan. 11, 2013, the contents of all of which are incorporated herein by reference in their entirety.

TECHNICAL FIELD

The present invention relates to an electronic device, in particular, a conductive polymer material used in an electrophotographic image forming device, a method for producing a conductive polymer material, and an image forming device member.

BACKGROUND ART

In the electrophotographic image forming device, an image forming device member formed of a conductive polymer material is used in the shape of a roller, a blade, and the like for charging, for developing, for transferring, for toner supplying, for cleaning, and the like.

As the conductive polymer material used for such an object, a material which has low hardness, does not contaminate a photoreceptor and a transfer material, and does not fuse with a toner is required, and thus a polymer elastomer and a polymer foam having rubber elasticity are used.

As a material configuring the polymer elastomer and the polymer foam, a polyurethane resin or the like is used which is obtained by curing solid rubber vulcanizate such as isoprene rubber, ethylene propylene rubber, silicone rubber, epichlorohydrin rubber, and acrylonitrile-butadiene rubber, and a liquid raw material such as a polyol by an isocyanate.

When it is required that the image forming device member has conductivity, for example, the image forming device member is adjusted to have a desired electrical resistance value by mixing a conductive material such as carbon black, and metal oxide, or adding an electrolyte. As the material configuring the polymer elastomer and the polymer foam, a polyurethane resin which is generated by using a polyol and a polyisocyanate as a main raw material is preferably used. The polyurethane resin has an advantage in that the polyurethane resin is able to impart conductivity by the conductive material and the electrolyte, is able to be used by dissolving the electrolyte in the liquid raw material, and is able to be a foamed body, as necessary.

The conductive polymer material including the polyurethane resin as a main constituent is manufactured by mixing a polyol component and a polyisocyanate component at a predetermined ratio, and by foaming and curing the mixture, as necessary. Then, the conductivity of the polyurethane resin is controlled by an added amount of the electrolyte or the like (for example, refer to Patent Document 1).

CITATION LIST

Patent Document

[Patent Document 1] JP 3331936 B2

SUMMARY OF INVENTION

Technical Problem

Recently, the image forming device is required to have high image quality, high resolution, and high speed, and thus an electrical load to the image forming device member due to continuous conduction increases. The electrical load of the image forming device member is increased by the continuous conduction, and thus an exchange treatment is necessarily performed in which resistance stability at the time of performing continuous conduction is insufficient. The image forming device member is required to have longer operating life, but the resistance stability at the time of the continuous conduction is insufficient, and thus a problem in operating life due to an increase in resistance occurs.

The present invention has been made for solving the problems described above, and an object thereof is to provide a conductive polymer material which can achieve longer operating life by improving resistance stability at the time of performing continuous conduction, a method for producing the conductive polymer material, and an image forming device member.

Solution to Problem

The present invention is as follows.

[1] A conductive polymer material, including a quaternary ammonium base incorporated in a main chain of a polymer material as an electrolyte cation; and an alkyl sulfate radical as an electrolyte anion.

[2] The conductive polymer material according to [1], in which the alkyl sulfate radical is an ethyl sulfate radical.

[3] The conductive polymer material according to [1] or [2], in which a blended amount of the quaternary ammonium base and the alkyl sulfate radical is 0.01 parts by mass to 10 parts by mass with respect to 100 parts by mass of the polymer material.

[4] The conductive polymer material according to any one of [1] to [3], in which the polymer material is a polar polymer.

[5] The conductive polymer material according to any one of [1] to [4], in which the polymer material is a polyurethane resin.

[6] The conductive polymer material according to any one of [1] to [5], in which the electrolyte cation is generated from a quaternary ammonium base having a hydroxyl group.

[7] A method for producing a conductive polymer material, the method including a step of mixing alkyl sulfate of quaternary ammonium which is able to react with polyisocyanate into a polymer material component; and a step of synthesizing a polymer material, and of incorporating a quaternary ammonium base in a main chain of the polymer material, in which an alkyl sulfate radical is dissolved in the polymer material, and remains.

[8] The method for producing a conductive polymer material according to [7], in which the quaternary ammonium base incorporated in the polymer material has a hydroxyl group.

[9] An image forming device member formed of the conductive polymer material according to any one of [1] to [6].

ADVANTAGEOUS EFFECTS OF INVENTION

According to the present invention, a conductive polymer material which can achieve longer operating life by improving resistance stability at the time of performing continuous conduction, a method for producing the conductive polymer material, and an image forming device member are able to be provided.

DESCRIPTION OF EMBODIMENTS

[Conductive Polymer Material]

Figure 1A:
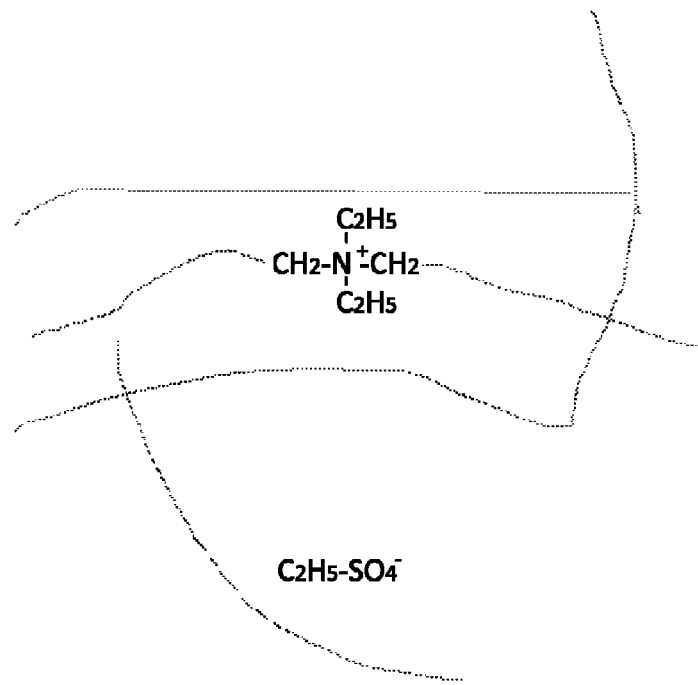
FIG. 1A is a diagram illustrating a conductive polymer material of the present invention in which a quaternary ammonium base is incorporated in a main chain.

As illustrated in FIG. 1A, a conductive polymer material according to an embodiment of the present invention contains a quaternary ammonium base incorporated in a main chain of a polymer material as an electrolyte location, and an alkyl sulfate radical as an electrolyte anion. The alkyl sulfate radical is in a state of not being fixed to a polymer main chain. It is preferable that the alkyl sulfate radical is an ethyl sulfate radical.

Figure 1B:
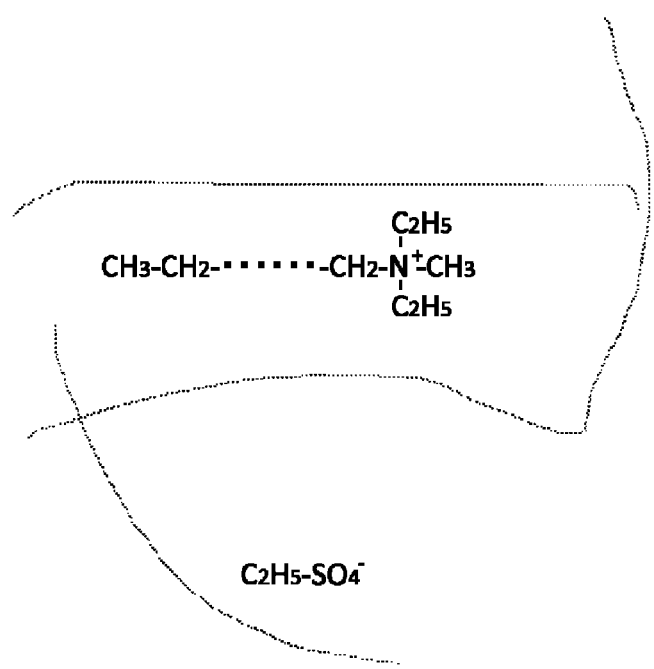
FIG. 1B illustrates the conductive polymer material of the related art in which a quaternary ammonium base is not incorporated in the main chain.

As illustrated in FIG. 1B, a conductive polymer material of the related art is in a state where both of an electrolyte location and an electrolyte anion are not fixed to a polymer main chain.

As the polymer material which is a main component, a polar polymer such as a polyurethane resin, an epichlorohydrin rubber, and a polyether resin is preferably used, and a two-liquid curable polyurethane resin is more preferably used.

As an example, the conductive polymer material is able to be obtained by dissolving a material in which a hydroxyl group is introduced to an alkyl chain of the quaternary ammonium base and a quaternary ammonium salt formed of an alkyl sulfate radical in a polyol component of a polyurethane raw material, and by reacting the dissolved material with a polyisocyanate component to be cured. When the conductive polymer material is able to be obtained, chain extension of a urethane bond is not stopped at a position in which the quaternary ammonium base is incorporated, and thus it is preferable that a bivalent or more hydroxyl group is introduced to the quaternary ammonium base.

As the polyol component configuring the polyurethane material, a polyether polyol, a polyester polyol, and the like are used, and in particular, a polyether polyol is preferably used in which ethylene oxide and propylene oxide are subjected to additive polymerization. The polyether polyol which is obtained by performing the additive polymerization with respect to ethylene oxide and propylene oxide, water, propylene glycol, ethylene glycol, glycerin, trimethylolpropane, hexanetriol, triethanolamine, diglycerin, pentaerythritol, ethylene diamine, methyl glucoside, an aromatic diamine, sorbitol, sucrose, a phosphoric acid, and the like are able to be used as a starting material. In particular, as a preferred starting material, water, propylene glycol, ethylene glycol, glycerin, trimethylolpropane, hexanetriol, and the like are included.

For a ratio or a micro-structure of added ethylene oxide and propylene oxide, a ratio of ethylene oxide is preferably 2% to 80%, and is more preferably 5% to 25%, from a viewpoint of flexibility of the main chain and conductivity at the time of adding the electrolyte.

It is preferable that the polyether polyol is obtained by adding ethylene oxide to a terminal from a viewpoint of reaction activity with respect to a polyisocyanate. In addition, it is preferable that arrangement of ethylene oxide and propylene oxide in a molecular chain of the polyether polyol is random from a viewpoint of heat resistance.

When the polyether polyol uses water, propylene glycol, and ethylene glycol as a starting material, the polyether polyol is a bivalent polyether polyol, it is preferable that the polyether polyol has weight-average molecular weight in a range of 300 to 6,000, and it is more preferable that the polyether polyol has weight-average molecular weight in a range of 400 to 3,000. In addition, when the polyether polyol uses glycerin, trimethylolpropane, and hexanetriol as a starting material, the polyether polyol is a trivalent polyether polyol, it is preferable that the polyether polyol has weight-average molecular weight in a range of 900 to 9,000, and it is more preferable that the polyether polyol has weight-average molecular weight in a range of 1,500 to 6,000. In addition, the bivalent polyol and the trivalent polyol are able to be used by being suitably mixed.

As the polyol component configuring the polyurethane material of the present invention, polytetramethylene ether glycol is able to be included. The polytetramethylene ether glycol, for example, is obtained by ring-opening polymerization of tetrahydrofuran, it is preferable that the polytetramethylene ether glycol has weight-average molecular weight in a range of 400 to 4,000, and it is more preferable that the polytetramethylene ether glycol has weight-average molecular weight in a range of 650 to 3,000. In addition, the polytetramethylene ether glycol may blend with polytetramethylene ether glycol having different molecular weight.

As the polyol component, the polyether polyol in which ethylene oxide and propylene oxide are subjected to additive polymerization, and the polytetramethylene ether glycol are able to be used by being mixed. In this case, from a viewpoint of tensile break strength, compressive residual strain, environmental dependency of conductivity at the time of adding the electrolyte, a ratio of the polyether polyol and the polytetramethylene ether glycol is preferably in a range of 90:10 to 10:90, and is more preferably in a range of 70:30 to 40:60.

In addition, in order to adjust elastic modulus or hardness within a range not impairing the object of the present invention, as a polyol, a polymer polyol which is subjected to an acrylonitrile modification, and a polyol in which melamine is added to a polyol, a polyester polyol which is obtained by condensing an acid component such as adipic acid and a glycol component such as ethylene glycol, a polyester polyol which is obtained by performing ring-opening polymerization with respect to ε-caprolactam, a polycarbonate diol, diols such as butane diol, polyols such as trimethylolpropane, or derivatives thereof are able to be used along with the polyol component described above in a range of 95:5 to 60:40 at a ratio to the polyol component described above by including the polyol component described above as a main component.

As the polyisocyanate component configuring the polyurethane material, a known polyisocyanate is able to be used, an aromatic isocyanate is preferably used, and tolylene diisocyanate, diphenyl methane diisocyanate, and a derivative thereof are more preferably used.

As the tolylene diisocyanate and the derivative thereof, crude tolylene diisocyanate, 2,4-tolylene diisocyanate, 2,6- tolylene diisocyanate, a mixture of 2,4-tolylene diisocyanate and 2,6-tolylene diisocyanate, a urea modified product thereof, a biuret modified product thereof, a carbodiimide modified product thereof, a urethane modified product which is modified by a polyol or the like, and the like are used.

As the diphenyl methane diisocyanate and the derivative thereof, diphenyl methane diisocyanate which is obtained by performing phosgenation of diaminodiphenyl methane and a derivative thereof is used. As the derivative of the diaminodiphenyl methane, a polynuclear body is included, and pure diphenyl methane diisocyanate which is obtained from the diaminodiphenyl methane, and polymeric diphenyl methane diisocyanate which is obtained from the polynuclear body of the diaminodiphenyl methane are used.

In addition, as the diphenyl methane diisocyanate and the derivative thereof, a derivative which is obtained by modification, for example, a urethane modified product which is modified by a polyol or the like, a dimer due to formation of uretidione, an isocyanurate modified product, a carbodiimide/uretonimine modified product, an allophanate modified product, a urea modified product, a biuret modified product, and the like are able to be used. Among them, as the diphenyl methane diisocyanate and the derivative thereof, the urethane modified product, and the carbodiimide/uretonimine modified product are more preferably used.

As the polyisocyanate component configuring the polyurethane material, tolylene diisocyanate, diphenyl methane diisocyanate, and a derivative thereof may be independently used, or a combination of two or more thereof may be used. In addition, as the polyisocyanate component configuring the polyurethane material, various aliphatic isocyanates such as hexamethylene diisocyanate and an alicyclic isocyanate such as isophorone diisocyanate, or a derivative thereof is able to be used.

In order to impart conductivity, an electrolyte is added to the conductive polymer material according to the embodiment of the present invention. As the electrolyte, a material in which a hydroxyl group is introduced to an alkyl chain of a quaternary ammonium base such as tetraethyl ammonium, tetrabutyl ammonium, lauryl trimethyl ammonium, stearyl trimethyl ammonium, octadecyl trimethyl ammonium, dodecyl trimethyl ammonium, hexadecyl trimethyl ammonium, benzyl trimethyl ammonium, a modified aliphatic dimethyl ethyl ammonium, and lauroyl aminopropyl dimethyl ethyl ammonium, and a quaternary ammonium salt formed of an alkyl sulfate radical are added to a raw material of the conductive polymer material. At this time, a perchlorate, a chlorate, a hydrochloride, a bromate, an iodate, a fluoroboric acid salt, a sulfate, an alkyl sulfate, a carboxylate, a sulfonate, a trifluoromethyl sulfate, and the like of an alkali metal such as lithium, sodium, calcium, and magnesium, an alkali earth metal, and the like may be additionally added in order to adjust conductivity of the polymer material within a range not impairing availability of the present invention. In addition, a lithium imide such as $(CF_3SO_2)_2NLi$ is able to be used as the electrolyte.

An added amount of the electrolyte is preferably 0.01 parts by mass to 10 parts by mass, and is more preferably 0.1 parts by mass to 3 parts by mass, with respect to 100 parts by mass of the polymer material. An initial resistance value of the conductive polymer material depends on a polarity of the polymer material, and when the added amount of the electrolyte is 0.01 parts by mass to 10 parts by mass, a predetermined resistance value is able to be easily obtained.

When the added amount of the electrolyte is greater than 10 parts by mass, the initial resistance value of the conductive polymer material decreases, and thus, in order to obtain a predetermined resistance value, the polymer material necessarily has non-polarity. When the polymer material has non-polarity, an effect of a surfactant agent is rarely obtained, and the size of the foam at the time of being foamed increases, and thus the texture of the image forming device member becomes rough. Accordingly, when the electrolyte is excessively added, a performance as the image forming device member decreases, and thus it is not preferable.

The electrolyte of the present invention has an active hydroxyl group, and thus is suitably included in calculation of a hydroxyl value of the polyol component.

As a reaction catalyst for curing the polyurethane composition including the polyurethane material, the electrolyte, and the like, for example, monoamines such as triethyl amine, and dimethyl cyclohexyl amine, diamines such as tetramethyl ethylene diamine, tetramethyl propane diamine, and tetramethyl hexane diamine, triamines such as pentamethyl diethylene triamine, pentamethyl dipropylene triamine, and tetramethyl guanidine, cyclic amines such as triethylene diamine, dimethyl piperazine, methyl ethyl piperazine, methyl morpholine, dimethyl aminoethyl morpholine, and dimethyl imidazole, alcohol amines such as dimethyl aminoethanol, dimethyl aminoethoxy ethanol, trimethyl aminoethyl ethanol amine, methyl hydroxyethyl piperazine, and hydroxyethyl morpholine, ether amines such as bis(dimethyl aminoethyl) ether, and ethylene glycol bis (dimethyl) aminopropyl ether, an organic metal compound such as stannous octoate, dibutyl tin diacetate, dibutyl tin dilaurate, dibutyl tin mercaptide, dibutyl tin thiocarboxylate, dibutyl tin dimaleate, dioctyl tin mercaptide, dioctyl tin thiocarboxylate, phenyl mercury propionate, and lead octenate, and the like are included.

Here, among the reaction catalysts, an organic tin catalyst is particularly preferable from a viewpoint of preventing an image defect which occurs due to movement of the remaining catalyst to the other image forming member. One of these reaction catalysts may be independently used, or a combination of two or more thereof may be used.

When the polyurethane member is in the shape of a foam, it is preferable that a silicone foam stabilizer and various surfactant agents are blended in the polyurethane in order to make a cell of the polyurethane member in the shape of a foam stable.

As the silicone foam stabilizer, a dimethyl polysiloxane-polyoxyalkylene copolymer and the like are preferably used, and a silicone foam stabilizer formed of a dimethyl polysiloxane part having molecular weight of 350 to 15,000, and a polyoxyalkylene part having molecular weight of 200 to 4,000 are particularly preferable. As a molecular structure of the polyoxyalkylene part, an additive polymer of ethylene oxide, and an additive copolymer of ethylene oxide and propylene oxide are preferably used, and it is preferable that a terminal thereof is ethylene oxide.

As the various surfactant agents, an ionic surfactant agent such as a cationic surfactant agent, an anionic surfactant agent, and an amphoteric surfactant agent, and a nonionic surfactant agent such as various polyethers, and various polyesters are included.

A blended amount of the silicone foam stabilizer and the various surfactant agents, is preferably 0.1 parts by mass to 10 parts by mass, and is more preferably 0.5 parts by mass to 5 parts by mass, with respect to 100 parts by mass of the polyurethane material, from a viewpoint of cell stabilization, a material price, and preventing an image defect which occurs due to movement to the other image forming member. In addition, when the silicone foam stabilizer and the various surfactant agents have an active hydroxyl group, the silicone foam stabilizer and the various surfactant agents are included in the calculation of the hydroxyl value of the polyol component.

As a foaming method at the time of manufacturing a polyurethane foam, for example, a method using a foaming agent such as water, an organic solvent, and various alternatives to chlorofluorocarbons, a method of mixing air bubbles by mechanical agitation, and the like are included. Among these foaming methods, the method of mixing the air bubbles by the mechanical agitation is particularly preferable, from a viewpoint of obtaining predetermined hardness without exerting a harmful influence on the environment. In a foaming state of the polyurethane foam, a maximum cell diameter is preferably less than 500 μm, and is more preferably less than 300 μm.

In addition, in order to obtain predetermined hardness, a bulk density is preferably in a range of 0.2 g/ml to 0.7 g/ml, and is more preferably in a range of 0.3 g/ml to 0.6 g/ml. When water is used as the foaming agent, the water is suitably included in the calculation of the hydroxyl value.

Blending and thermally curing at the time of manufacturing the polyurethane member are preferably performed by a method in which the polyol component, the isocyanate component, the electrolyte, and the reaction catalyst described above, and various additive components which are used as necessary are mixed and agitated, and the air bubbles are mixed using the methods described above, as necessary. Then, the various additive components which are mixed and agitated are cast into a predetermined mold or the like or are freely foamed into the shape of a block, and then are thermally cured.

In addition, blending and thermally curing at the time of manufacturing the polyurethane member, other than that described above, are also able to be performed by a prepolymer method in which a prepolymer having an isocyanate group is prepared by reacting the polyol component with an isocyanate component in advance, and then the prepolymer is cured by using a chain extender such as ethylene glycol, 1,4-butane diol, and trimethylol propane. At this time, the prepolymer is treated as an isocyanate component, and the chain extender is suitably included in the calculation of the hydroxyl value of the polyol component.

[Method for Producing Conductive Polymer Material] A method for producing a conductive polymer material according to the embodiment of the present invention will be described with reference to Figs. 2A-2D.

Figure 2A:
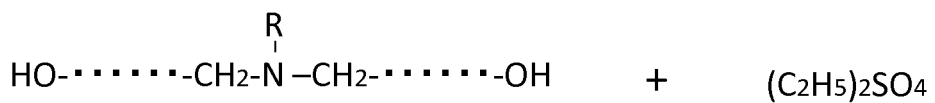
FIGS. 2A-2D are an operating flow chart illustrating a method for producing a conductive polymer material of the present invention.
Figure 2B:
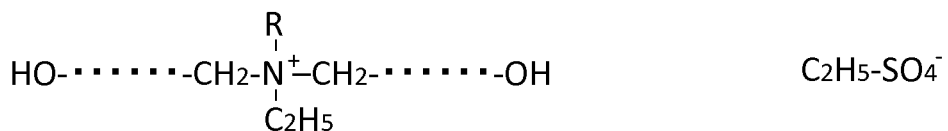

First, as a step of generating an alkyl sulfate of a quaternary ammonium which is able to react with a polyisocyanate, as illustrated in FIG. 2A, a polyoxyethylene alkyl amine reacts with diethyl sulfate, and thus an alkyl sulfate of a quaternary ammonium containing a hydroxyl group in a cation is generated (refer to FIG. 2B).

Figure 2C:
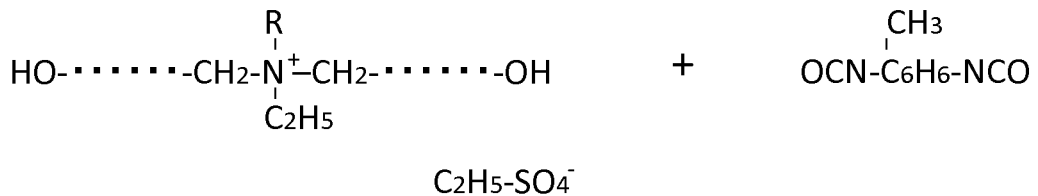

Next, as a step of mixing the alkyl sulfate of the quaternary ammonium into the polymer material component, as illustrated in FIG. 2C, the alkyl sulfate of the quaternary ammonium containing a hydroxyl group in the cation is mixed into the polyol component of the polyurethane raw material.

Figure 2D:
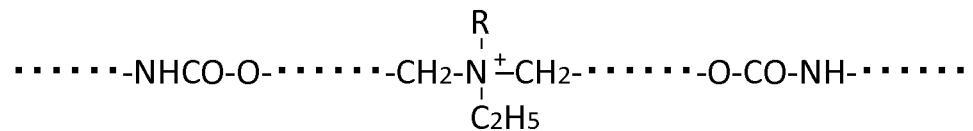
Figure 2D:
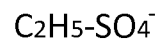

Next, as a step of synthesizing the polymer material, and of incorporating a quaternary ammonium base in a main chain of the polymer material, as illustrated in Fig. 2D, polyurethane is synthesized by reacting with the isocyanate component. The hydroxyl group of the quaternary ammonium base reacts with the isocyanate, and the quaternary ammonium base is incorporated in a main chain of the polyurethane. Furthermore, an ethyl sulfate radical remains by being dissolved in a polyurethane resin.

As the other method of incorporating the quaternary ammonium base in the main chain of the polymer material, a method is included in which a double bond is introduced to an alkyl chain of the quaternary ammonium base, and the quaternary ammonium salt is fixed at the time of cross-linking a main chain polymer by sulfur vulcanization.

In addition, as the other method of incorporating the quaternary ammonium base in the main chain of the polymer material, a method is included in which an amphoteric electrolyte is generated by introducing a carboxylate radical to the alkyl chain of the quaternary ammonium base, and then is involved in the main chain of the polymer material which is formed in a carboxylate radical part by an ester bond.

The method of incorporating the quaternary ammonium base in the main chain of the polymer material is not limited to the methods described above insofar as the quaternary ammonium base is incorporated in the main chain of the polymer material, and various methods are able to be adopted.

[Image Forming Device Member]

The image forming device member using the conductive polymer material of the present invention includes the conductive polymer material described above as a constituent, and is usually configured along with a metal member.

As a structure of the image forming device member, a structure is able to be included in which a part or all of a metal member obtained by performing zinc plating or the like with respect to a steel material such as sulfur free-cutting steel, and a metal member of aluminum, stainless steel, phosphor bronze, and the like is covered with the conductive polymer material. The image forming device member is used in the shape of a roller, a blade, a belt, or the like according to an intended purpose.

When a case of a polymer elastic roller will be specifically described as an example of the image forming device member, a polymer elastic roller is able to be exemplified in which a shaft in which the zinc plating or the like is performed with respect to the sulfur free-cutting steel or the like is cylindrically covered with the conductive polymer material having elasticity, and as necessary, a conductive coating material, a semiconductive coating material, or an insulating coating material is applied to the outside thereof.

In addition, as an example of the image forming device member, a film and a belt of the polymer material are covered with the conductive polymer material, and then are able to be the image forming device member. In addition, the conductive polymer material of the present invention is able to be used as an adhesive agent of the image forming device member.

As an adhering method of the metal member and the other polymer material, to the conductive polymer material of the present invention, a method is able to be adopted in which the metal member or the like is arranged in a mold in advance, and the conductive polymer material is cast and cured.

In addition, as an adhering method of the metal member and the other polymer material, to the conductive polymer material of the present invention, a method is able to be adopted in which the conductive polymer material of the present invention is molded into a predetermined shape, and then is attached to the metal member or the like.

In any adhering method, an adhesive layer is able to be disposed between the metal member and the polyurethane member, as necessary, and not only is an adhesive agent, a hot melt sheet, or the like which is formed of the conductive coating material able to be used, but also the conductive polymer material of the present invention is able to be used as the adhesive agent.

As a molding method of the conductive polymer material of the present invention, a method of cutting a block in a predetermined dimension by cutting machining, a method of making a predetermined dimension by a polishing treatment, a method of suitably combining these methods, and the like are able to be used in addition to the method of casting the conductive polymer material into a mold having a predetermined shape described above.

The image forming device member formed of the conductive polymer material of the present invention is able to be used as a charging member, a developing member, a transfer member, a cleaning member, a toner supply member, a toner layer regulation member, and the like, and is able to be used in the shape of a roller, a blade, and the like.

Figure 3:
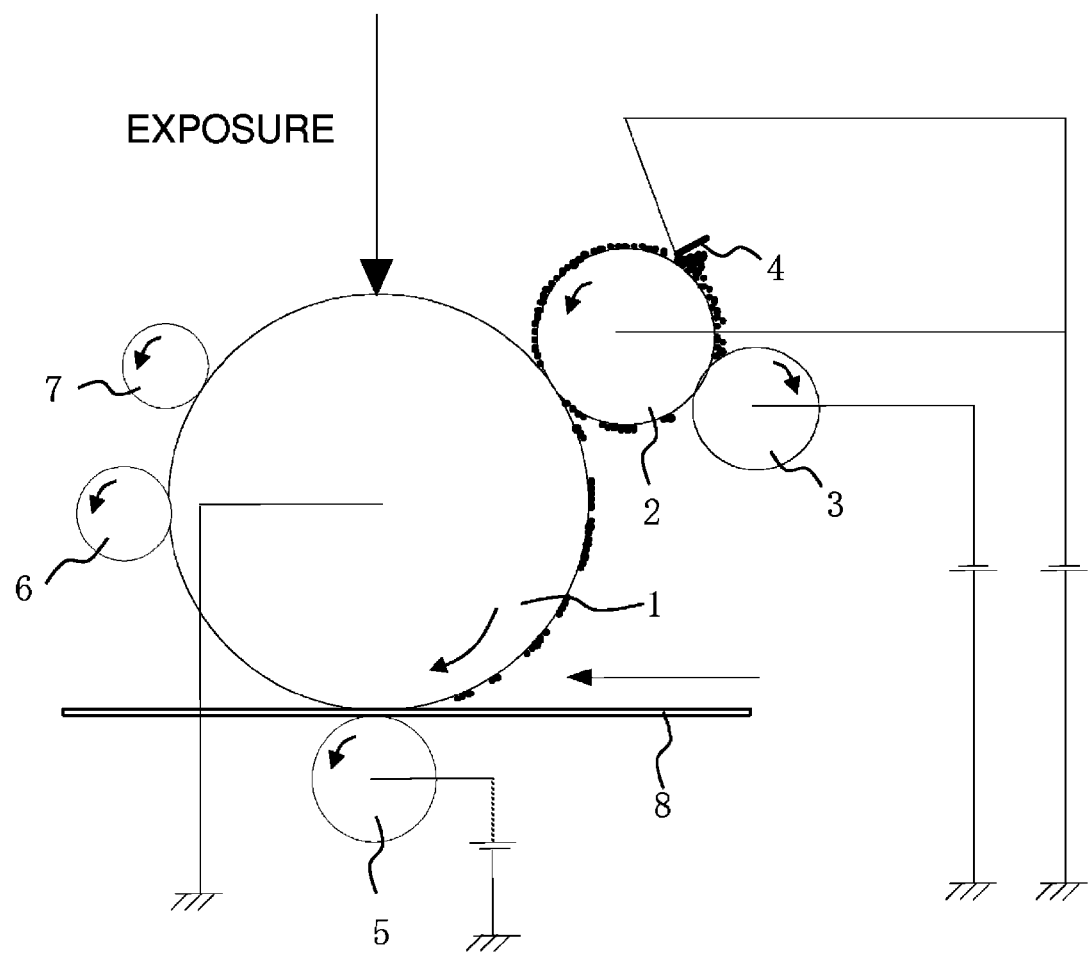
FIG. 3 is an explanatory diagram illustrating an example of an electrophotographic image forming device in which an image forming device member of the present invention is mounted.

An example of an electrophotographic image forming device in which the conductive polymer material of the present invention is mounted as the image forming device member is illustrated in FIG. 3. As the image forming device member mounted in the image forming device, a developing roller 2, a toner supply roller 3, a toner layer regulation blade 4, a transfer roller 5, a cleaning roller 6, and a charging roller 7 are included.

A photoreceptor 1 is a roller-like member which is able to maintain an electrostatic latent image by using a potential difference in a surface. The photoreceptor 1 is arranged in contact with the developing roller 2, the transfer roller 5, the cleaning roller 6, and the charging roller 7. The developing roller 2 is arranged between the photoreceptor 1 and the toner supply roller 3 to be in contact with each of the photoreceptor 1 and the toner supply roller 3. The toner layer regulation blade 4 which adjust a toner supplied onto a surface of the developing roller 2 to be a uniform thin layer is arranged in the developing roller 2.

In a charging step, a voltage is applied to the charging roller 7, and an electric charge is uniformly applied to a surface of the photoreceptor 1.

In an exposing step, the surface of the photoreceptor 1 is irradiated with light, and an electrostatic latent image is formed.

In a developing step, due to friction between the developing roller 2 and the toner supply roller 3, the toner therebetween is charged. The toner supplied onto the developing roller 2 is maintained on the surface of the developing roller 2, and is formed into a thin layer at the time of passing through a contact portion with the toner layer regulation blade 4. Then, the toner formed into the thin layer is moved to the contact portion with the photoreceptor 1 by rotation of the developing roller 2. Various electric fields in which the toner is moved to the photoreceptor 1 side in a portion which is irradiated with the light in the exposing step, and the toner is maintained at the developing roller 2 side in a portion which is not irradiated with the light, are formed between the photoreceptor 1 and the developing roller 2.

In a transferring step, the toner developed on the photoreceptor 1 is moved onto the transfer material 8 by an electrostatic force.

In a fixing step, the toner on the transfer material 8 is melted and fixed due to heat or a pressure.

In a cleaning process, a small amount of toner which remains on the photoreceptor 1 without being moved onto the transfer material 8 in the transferring process is scraped by the cleaning roller 6.

According to the conductive polymer material of the present invention, the quaternary ammonium base is incorporated in the main chain of the polymer material, and thus it is possible to suppress an increase in resistance due to polarized electrophoresis of the electrolyte even in continuous conduction. The conductive polymer material of the present invention rarely increases the resistance in the continuous conduction, and thus it is preferable to be used as the image forming device member which is required to have resistance stability. That is, the conductive polymer material of the present invention is able to manufacture the image forming device member which is able to be used in the image forming device in the shape of an elastic roller such as a charging roller, a developing roller, a transfer roller, a toner supply roller, and a cleaning roller, an elastic blade such as a toner layer regulation blade, and a cleaning blade, and the like.

EXAMPLE

Next, the present invention will be described in detail with reference to examples, but the present invention is not limited to these examples.

Example 1

<Preparation of Conductive Polymer Material and Image Forming Device Member>

A polyoxyethylene alkyl amine (manufactured by Kao Corporation, "Amiet 105") was quaternized by equivalently reacting with diethyl sulfate, and thus an ethyl sulfate of a quaternary ammonium to which a bivalent hydroxyl group is introduced was prepared.

Next, raw materials shown in the following (1) to (7) were mixed at a ratio of 60.0:40.0:4.0:2.5:1.0:0.1:0.01 in a mass ratio, and thus a polyol component was obtained.

(1) A polyether polyol which was obtained by randomly adding propylene oxide and ethylene oxide to glycerin, and had molecular weight of 5,000

(2) Polytetramethylene ether glycol having molecular weight of 1,000

(3) A silicone foam stabilizer which was a dimethyl polysiloxane-polyoxyalkylene copolymer (a OH value was 45.0)

(4) A black colorant in which a black pigment was dispersed in a polyol (a OH value was 56.0)

(5) An ethyl sulfate of a quaternary ammonium which was obtained by quaternizing Amiet 105

(6) Lithium bistrifluoromethanesulfone imide (7) Dibutyl tin dilaurate

A moisture percentage of a polyol component was 0.05%.

A polyisocyanate component of which an isocyanate content rate of diphenyl methane diisocyanate was 34.0% was used.

The polyol component and the polyisocyanate component were mixed at a ratio of 107.61:17.69 in a mass ratio, and were foamed by mechanical agitation. The mixture was cast in a mold in which a metal shaft having a diameter of 6 mm was arranged in the center, and then was cured at 100° C. for 10 hours, and thus a roller manufactured of a urethane foam having a diameter of 16.5 mm and a length of 215 mm was prepared.

<Physical Property Evaluation and Verification>

A bulk density of a foam part was 0.40 g/ml, and Asker C hardness was 40.

The roller was placed on an aluminum plate having a thickness of 5 mm, and electrical resistance between the shaft and a copper plate was measured while respectively performing pressure welding with respect to both ends of the roller with a force of 500 g. Roller resistance when the roller was used as a transfer roller of an image forming device is preferably $10^{7.0}$ to $10^{9.0}$ [Ω], and is more preferably $10^{7.5}$ to $10^{8.5}$ at a temperature of 23° C., relative humidity of 50%, and an applied voltage of 3,000 V. The temperature and the humidity at the time of the measurement were 23° C. and 50%, respectively, and the electrical resistance was $10^{8.1}$ [Ω] at the applied voltage of 3,000 V.

The roller was incorporated in the image forming device as the transfer roller 5 illustrated in FIG. 3. A grayscale image, a black solid image, and a white solid image were printed in an environment where the temperature and the humidity were 23° C. and 50%, respectively. All of the grayscale image, the black solid image, and the white solid image were excellent. The printing was continuously performed at an image density of 2% and 500,000 sheets were printed, and then a grayscale image, a black solid image, and a white solid image were printed. All of the grayscale image, the black solid image, and the white solid image were excellent.

Comparative Example 1

<Preparation of Conductive Polymer Material and Image Forming Device Member>

The ethyl sulfate of the quaternary ammonium to which the bivalent hydroxyl group was introduced in the raw material of the polyol component of Example 1 was changed to ethyl sulfate of a modified aliphatic diethyl methyl ammonium. As for the rest, a roller was prepared by the same method as that in Example 1 with the same raw material and the same blending ratio.

<Physical Property Evaluation and Verification>

Physical properties of the roller were evaluated by the same method as that in Example 1, and a bulk density was 0.40 g/ml, Asker C was 40, and electrical resistance was $10^{7.9}$ [Ω].

Printing was performed using this roller by the same method as that in Example 1, and all images were excellent. The printing was continuously performed at an image density of 2% and 500,000 sheets were printed, then images of 350,000 sheets were shifted, and the electrical resistance was measured, then the resistance increased to $10^{9.2}$ [Ω]. It is considered that the ethyl sulfate of the modified aliphatic diethyl methyl ammonium was polarized due to conduction.

Example 2

<Preparation of Conductive Polymer Material and Image Forming Device Member>

An ethyl sulfate of a quaternary ammonium to which a bivalent hydroxyl group was introduced was prepared by the same method as that in Example 1.

<<Preparation of Conductive Polymer Roller>>

Next, raw materials shown in the following (1) to (7) were mixed at a ratio of 26.0:13.0:13.5:2.7:1.9:0.2:0.03 in a mass ratio, and thus a polyol component was obtained.

(1) A polyether polyol which was obtained by adding propylene oxide and ethylene oxide to glycerin, and had molecular weight of 5,000

(2) A polyether polyol which was obtained by adding propylene oxide to ethylene glycol, and had molecular weight of 500

(3) A polyether polyol which was obtained by adding propylene oxide to ethylene glycol, and had molecular weight of 1,000

(4) A silicone foam stabilizer which was a dimethyl polysiloxane-polyoxyalkylene copolymer (5) An ethyl sulfate of a quaternary ammonium to which a bivalent hydroxyl group was introduced (6) Sodium perchlorate (7) Dibutyl tin dilaurate Tolylene diisocyanate was added to the polyether polyol which was obtained by adding the propylene oxide and the ethylene oxide to the glycerin, and had molecular weight of 5,000 by greater than or equal to two times of an equivalent reaction, acetylene black 2 was mixed to a prepolymer 100 of which an NCO content rate was 7%, and thus an isocyanate component was obtained.

The polyol component and the isocyanate component were mixed at a ratio of 57.33:102.0 in a mass ratio, were foamed by mechanical agitation, and the mixture was cast in a mold in which a metal shaft having a diameter of 6 mm was arranged in the center, and then was cured at 100° C. for 10 hours, and thus a conductive polymer roller having a diameter of 16.5 mm and a length of 215 mm was prepared.

<<Preparation of Adhesive Agent>>

Raw materials shown in the following (1) to (5) were mixed at a ratio of 100.0:10.0:2.0:2.0:476 in a mass ratio, and thus a polyol component was obtained.

(1) Polytetramethylene ether glycol having molecular weight of 2,000

(2) Acetylene black (3) An ethyl sulfate of a quaternary ammonium to which a bivalent hydroxyl group was introduced (4) Lithium bistrifluoromethanesulfone imide (5) Methyl ethyl ketone As the isocyanate component, diphenyl chloromethane diisocyanate was used.

The polyol component and the isocyanate component were mixed at a ratio of 59065 and thus an adhesive agent was prepared.

<<Preparation of Coating Agent>>

Raw materials shown in the following (1) to (7) were mixed at a ratio of 100.0:110.0:15.0:20.0:25.0:31.0:1.0 in a mass ratio, and thus a polyol component was obtained.

(1) Polytetramethylene ether glycol having molecular weight of 2,000

(2) Methyl ethyl ketone (3) Silica (4) Acetylene black (5) Zinc oxide (6) A block copolymer of methacrylate ester and methacrylate polysiloxane ester (7) An ethyl sulfate of a quaternary ammonium to which a bivalent hydroxyl group was introduced As the isocyanate component, an isocyanate component was used in which phenyl methane diisocyanate and isophorone diisocyanate were mixed at a ratio of 18:27 at the time of modifying glycol.

The polyol component and the isocyanate component were mixed at a ratio of 302:45, and thus a coating agent was prepared.

<<Preparation of Developing Roller and Verification>>

The adhesive agent was applied to the conductive polymer roller by dip coating, and then, the coating agent was applied thereto by dip coating, and thus a developing roller was prepared. Both thicknesses of the adhesive agent and the coating agent of the developing roller were 20 μm, and electrical resistance of the developing roller was $10^{6.5}$ [Ω] at an applied voltage of 250 V.

The roller was incorporated in the image forming device illustrated in FIG. 3 as the developing roller 2. A grayscale image, a black solid image, and a white solid image were printed in an environment where a temperature and humidity were 23° C. and 50%, respectively. All of the grayscale image, the black solid image, and the white solid image were excellent. The printing was continuously performed at an image density of 2% and 200,000 sheets were printed, and then a grayscale image, a black solid image, and a white solid image were printed. All of the grayscale image, the black solid image, and the white solid image were excellent.

Comparative Example 2

<Preparation of Conductive Polymer Material and Image Forming Device Member>

The ethyl sulfate of the quaternary ammonium to which the bivalent hydroxyl group was introduced in the raw materials of all polyol components of the conductive polymer roller, the adhesive agent, and the coating agent of Example 2 was changed to an ethyl sulfate of a modified aliphatic diethyl methyl ammonium. As for the rest, a developing roller was prepared by the same method as that in Example 2 with the same raw material and the same blending ratio.

<Physical Property Evaluation and Verification>

Both thicknesses of the adhesive agent and the coating agent of the developing roller were 20 μm. Electric resistance of the developing roller was $10^{6.3}$ [Ω] at an applied voltage of 250 V.

Printing was performed using this roller by the same method as that in Example 1, and all images were excellent. The printing was continuously performed at an image density of 2% and 200,000 sheets were printed, then images of 40,000 sheets were shifted, and the electrical resistance was measured, then the resistance increased to $10^{7.7}$ [Ω]. It is considered that the ethyl sulfate of the modified aliphatic diethyl methyl ammonium was polarized due to conduction.

REFERENCE SIGNS LIST

1 . . . PHOTORECEPTOR
2 . . . DEVELOPING ROLLER
3 . . . TONER SUPPLY ROLLER
4 . . . TONER LAYER REGULATION BLADE
5 . . . TRANSFER ROLLER
6 . . . CLEANING ROLLER
7 . . . CHARGING ROLLER
8 . . . TRANSFER MATERIAL

The invention claimed is:

1. An image forming device member formed of a conductive polymer material,
wherein the conductive polymer material contains a quaternary ammonium base incorporated in a main chain of a polymer material as an electrolyte cation; and
an alkyl sulfate radical as an electrolyte anion;
the conductive polymer material is a polyurethane resin: and
a blended amount of the quaternary ammonium base and the alkyl sulfate radical is 0.01 parts by mass to 10 arts by mass with respect to 100 parts by mass of the polymer material.

2. The image forming device member according to claim 1,
wherein the alkyl sulfate radical is an ethyl sulfate radical.

3. The image forming device member according to claim 1,
wherein the electrolyte cation is generated from a quaternary ammonium base having a hydroxyl group.

4. A method for producing a conductive polymer material, comprising:
a step of mixing an alkyl sulfate of a quaternary ammonium which is able to react with a polyisocyanate into a polymer material component; and
a step of synthesizing a polymer material, and of incorporating a quaternary ammonium base in a main chain of the polymer material,
wherein an alkyl sulfate radical is dissolved in the polymer material, and remains,
the conductive polymer material is a polyurethane resin, and
a blended amount of the quaternary ammonium base and the alkyl sulfate radical is 0.01 parts by mass to 10 parts by mass with respect to 100 parts by mass of the polymer material.

5. The method for producing a conductive polymer material according to claim 4,
wherein the quaternary ammonium base incorporated in the polymer material has a hydroxyl group.

6. The image forming device member according to claim 1, wherein the blended amount of the quaternary ammonium base and the alkyl sulfate radical is 0.1 parts by mass to 3 parts by mass with respect to 100 parts by mass of the polymer material.

7. The image forming device member according to claim 1, wherein the image forming device is in the shape of an elastic roller selected from the group consisting of a charging roller, a developing roller, a transfer roller, a toner supply roller, and a cleaning roller.

8. The image forming device member according to claim 1, wherein polyol component configuring the polyurethane material comprises a polyether polyol and a polytetramethylene ether glycol, and a ratio of the polyether polyol and the polytetramethylene ether glycol is in the range of 70:30 to 40:60.

9. The image forming device member according to claim 8, wherein the polyether polyol is obtained by additive polymerization of ethylene oxide and propylene oxide.

* * * * *